US010914366B2

(12) United States Patent
Uhkoetter

(10) Patent No.: US 10,914,366 B2
(45) Date of Patent: Feb. 9, 2021

(54) GEARING DEVICE

(71) Applicant: Rolls-Royce Deutschland Ltd & Co KG, Blankenfelde-Mahlow (DE)

(72) Inventor: Stephan Uhkoetter, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 353 days.

(21) Appl. No.: 15/950,856

(22) Filed: Apr. 11, 2018

(65) Prior Publication Data

US 2018/0306293 A1 Oct. 25, 2018

(30) Foreign Application Priority Data

Apr. 19, 2017 (DE) .................. 10 2017 108 333

(51) Int. Cl.
| | | |
|---|---|---|
| F16H 41/30 | (2006.01) | |
| F01D 25/18 | (2006.01) | |
| F02C 7/06 | (2006.01) | |
| F16N 7/36 | (2006.01) | |
| F16H 55/08 | (2006.01) | |

(Continued)

(52) U.S. Cl.
CPC .......... *F16H 41/30* (2013.01); *F01D 25/183* (2013.01); *F02C 7/06* (2013.01); *F02C 7/36* (2013.01); *F16H 1/32* (2013.01); *F16H 55/08* (2013.01); *F16H 57/0427* (2013.01); *F16H 57/0441* (2013.01); *F16H 57/0482* (2013.01); *F16H 57/082* (2013.01); *F16N 7/363* (2013.01); *F05D 2220/323* (2013.01); *F05D 2240/55* (2013.01);

(Continued)

(58) Field of Classification Search
None
See application file for complete search history.

(56) References Cited

U.S. PATENT DOCUMENTS

| | | |
|---|---|---|
| 1,953,068 A | 4/1934 | Barker et al. |
| 2,935,889 A | 5/1960 | Adams et al. |

(Continued)

FOREIGN PATENT DOCUMENTS

| | | |
|---|---|---|
| AT | 311189 B | 11/1973 |
| DE | 2648600 A1 | 5/1977 |

(Continued)

OTHER PUBLICATIONS

German Search Report dated Dec. 19, 2017 for counterpart German Application No. DE 10 2017 108 333.2.

*Primary Examiner* — Justin Holmes
(74) *Attorney, Agent, or Firm* — Shuttleworth & Ingersoll, PLC; Timothy J. Klima

(57) ABSTRACT

A gear device with at least one rotating structural component, with a further structural component that delimits at least one supply area and with at least one consumption point that is to be supplied with hydraulic fluid via the supply area. Hydraulic fluid from at least one hydraulic fluid supply device can be introduced into the at least supply area via at least one supply opening, and can be discharged via at least one outlet opening from the at least one supply area for supplying the at least one consumption point. Inside the supply area, at least one pumping appliance driven by the structural component is provided for transporting hydraulic fluid from the at least one supply opening in the direction of the at least one outlet opening.

17 Claims, 8 Drawing Sheets

(51) Int. Cl.
  *F16H 1/32*   (2006.01)
  *F16H 57/08*  (2006.01)
  *F02C 7/36*   (2006.01)
  *F16H 57/04*  (2010.01)

(52) U.S. Cl.
  CPC .............. *F05D 2260/40311* (2013.01); *F16N 2210/02* (2013.01)

(56) References Cited

U.S. PATENT DOCUMENTS

| | | | |
|---|---|---|---|
| 4,329,887 A | 5/1982 | Kawamoto | |
| 8,702,373 B1 * | 4/2014 | Valva | F01M 1/02 415/111 |
| 2013/0313053 A1 | 11/2013 | Andersson et al. | |
| 2015/0089918 A1 * | 4/2015 | Valva | F01D 25/20 60/39.08 |
| 2015/0300255 A1 | 10/2015 | Gallet et al. | |
| 2016/0003245 A1 * | 1/2016 | Ike | F16H 57/0434 417/362 |
| 2016/0032773 A1 * | 2/2016 | James | F01D 15/12 416/170 R |
| 2016/0201568 A1 * | 7/2016 | Sheridan | F02K 3/06 415/1 |
| 2017/0370288 A1 | 12/2017 | Uhkoetter | |

FOREIGN PATENT DOCUMENTS

| | | |
|---|---|---|
| DE | 3004365 A1 | 8/1980 |
| DE | 102016111855 | 12/2017 |
| GB | 1558489 A | 1/1980 |

* cited by examiner

GEARING DEVICE

This application claims priority to German Patent Application DE102017108333.2 filed Apr. 19, 2017, the entirety of which is incorporated by reference herein.

The invention relates to a gear device according to the kind as is defined in the resent disclosure.

Jet engines or aircraft engines as they are known from practice are embodied, among other components, with gear devices that are embodied as a planetary gear and via which a fan is in operative connection with a turbine appliance. Here, these planetary gears in standard design usually comprise a hollow wheel, multiple planetary wheels and a sun wheel, which are in mesh with each other. In the area of a fan shaft, the fan is connected to the planetary carrier of the planetary gear, while a shaft of the turbine appliance is coupled to the sun wheel. In this manner, it is achieved that a drive torque of the turbine appliance that is applied to the planetary gear via the shaft of the turbine appliance is increased corresponding to the stationary gear ratio of the planetary gear, and is supplied to the fan shaft, while the rotational speed of the shaft of the turbine appliance is larger than the rotational speed of the fan shaft by the factor of the stationary gear ratio of the planetary gear.

To be able to ensure a sufficient lubrication and cooling of bearings and tooth meshings in particular in so-called high-speed planetary gear sets and to be able to dissipate heat losses occurring during operation to a desired degree, the planetary gears are supplied with oil by an oil pump in known jet engines. By means of the oil pump, oil is supplied to the planetary gear with a pressure as it is necessary for supplying the bearings and tooth meshings.

In order to be able to maintain the necessary pressure in the area of the planetary gear, contact seals through which the area of the rotating planetary gear can be sealed against the static environment and which are subject to wear and tear are disadvantageously provided in the area of the planetary gear inside of which the oil, which is supplied under pressure, is transported further to the areas of the planetary gear that are to be supplied with oil to the desired extent, such as tooth meshings between the hollow wheel and the planetary wheels or between the planetary wheels and the sun wheel as well as the bearing units.

What is known from the unpublished DE 10 2016 111 855.9 by the applicant is to seal an internal space of a housing of a device of a jet engine against an environment by means of at least one seal independently of the operating state, through which a sealing effect between a rotatable structural component and a structural component fixedly attached to the housing is provided at least up to a defined threshold value of the rotational speed of the rotatable structural component. During operation, the at least one seal opens a gap due to the centrifugal force that acts at the rotating structural component, whereby an internal space of the housing and the environment are connected to each other via the gap that is opened in the area of the seal. The oil that is supplied into the internal space of the device via an oil nozzle arranged in the internal space of the device is supplied by the oil nozzle to consumption points of the device that are arranged radially further outside due to the centrifugal force that is acting at the introduced oil during operation.

However, here there is the problem that that, during unfavorable operational state developments, a necessary oil supply is not ensured by means of oil being supplied based on the centrifugal force. In addition, the sealing effect of the seal is reduced due to the fact that the seal opens the gap during operation for decreasing wear and tear, whereby an oil pressure present upstream of the oil nozzle cannot be maintained during operation of the device in the internal space of the device for a further supply of the oil to the consumption points, and cannot be used to the previously described extent.

The present invention is based on the objective of providing a gear device that can be supplied with hydraulic fluid to the desired extent in a constructionally simple manner.

According to the invention, this objective is achieved by a gear device with features as disclosed herein.

What is proposed is a gear device, in particular a planetary gear device, with at least one rotating structural component, with a further structural component that delimits at least one supply area and with at least one consumption point that is to be supplied with hydraulic fluid via the supply area, in particular tooth meshings and/or bearings of the gear device, wherein hydraulic fluid from at least one hydraulic fluid supply device can be introduced into the at least one supply area via at least one supply opening, and can be discharged from the supply area via at least one outlet opening.

According to the invention, it is provided that at least one pumping appliance, which can be driven by the structural component of the gear device, is provided inside the supply area for transporting hydraulic fluid from the at least one supply opening in the direction of the at least one outlet opening.

In a gear device that is embodied according to the invention, a hydraulic fluid pressure, as it is necessary for supply the loads of the gear device to a sufficient extent, is provided in a constructionally simple manner through the pumping appliance, which is why it is not necessary to provide sealing of the supply area against the environment, which is subject to wear and tear. This is possible due to the fact that the gear device according to the invention can also be sufficiently supplied with hydraulic fluid with a supply pressure that is lower than the supply pressure that has to be applied for supplying known gear appliances.

Here, the hydraulic fluid is supplied from the at least one hydraulic fluid supply device, which may for example be attached to the housing, to the at least one outlet opening, which in particular rotates about a rotational axis of the gear device.

Here, it can be provided that, in particular in the radial direction, the at least one outlet opening has a larger distance to the central axis with respect to a central axis of the gear device, which can be the rotational axis of a sun wheel in the case that the gear device is embodied as a planetary gear, than the at least one supply opening.

A difference of a rotational speed of the structural component with respect to the further structural component delimiting the supply area is used for driving the pumping appliance in order to be able to provide a hydraulic fluid volume flow or hydraulic fluid pressure for a sufficient supply of the gear device inside the supply area and downstream of the supply device as well as upstream of the outlet opening, without having to provide an elaborate sealing of the supply area against the environment in the area of the supply opening for that purpose. In the gear device according to the invention, a hydraulic fluid volume flow being discharged from the outlet opening can be achieved in a simple manner, which is not only sufficient for supplying the bearing appliances of the gear device, but also for supplying the tooth meshings, wherein a higher supply pressure is usually necessary for supplying the tooth meshings.

In an advantageous embodiment of the gear device according to the invention, the at least one pumping appliance is embodied as a flow pump or as a centrifugal pump or as a positive displacement pump. The pumping appliance can be an axial pump, a radial pump and/or a diagonal pump, and can provide a constant or a varying hydraulic fluid supply flow. The pumping appliance can for example be embodied with an Archimedes screw.

In an advantageous embodiment of the gear device, multiple pumping appliances are arranged behind each other inside the supply area in the flow direction of the supplied hydraulic fluid and are switched in series with each other in order to be able to provide a particularly high hydraulic fluid pressure as well as a sufficient hydraulic fluid volume flow for supplying the loads of the gear device. Here, pumping appliances of the same design or of different designs can be combined with each other.

In an embodiment of the gear device according to the invention that is constructionally simple and may be realized in a cost-effective manner, at least one pumping appliance is connected in a torque-proof manner with the structural component and is preferably in operative connection with the structural component in such a manner that it is not displaceable in the axial direction and/or in the radial direction, so that the pumping appliance is fixated in a sufficiently defined manner through the connection to the structural component alone.

In a simple embodiment of the invention, the pumping appliance has an impeller that is connected in a torque-proof manner to the structural component.

If the pumping appliance is connected to the structural component of the gear device by means of a splined connection and is mounted in the area of a further rotatable structural component of the gear device by means of a bearing appliance, a relative movement of the pumping appliance in the radial direction with respect to the structural component is made possible in a constructionally simple manner. In particular in a pumping appliance that is embodied with an impeller, a gap between the pumping appliance and the further structural component can thus be set so as to be particularly small, so that the pumping appliance can be operated with a high efficiency.

In order to be also able to provide a high hydraulic fluid pressure, which is in particular necessary for supplying tooth meshings of the gear device, in a constructionally simple manner, a pressure recovery appliance can be arranged downstream of the pumping appliance.

In the area of such a pressure recovery appliance, a dynamic pressure is at least partially transformed into a static pressure.

In a simple embodiment of the gear device according to the invention that is advantageous with respect to the installation space in the axial direction, the pressure recovery appliance has a further impeller that is connected in a torque-proof manner to the further structural component and contains the impeller at the circumferential side.

The impeller and/or the further impeller can be embodied with blades that are straight or bent in the axial direction and/or the radial direction and/or the circumferential direction of the respective rotational axis, wherein, for achieving a desired pressure increase, the blades of the further impeller are embodied with a curvature that is opposite to the curvature of the blades of the impeller in particular in the circumferential direction. This means that the surfaces of the blades of the impeller are realized with a convex or a concave curvature at least in certain sections if the surfaces are curved in a concave or convex manner at least in certain sections.

In an advantageous embodiment of a gear device according to the invention, the pressure recovery appliance is embodied with a voluted supply area that is arranged radially outside of the impeller or the further impeller, and extends in the circumferential direction of the structural component or of the further structural component at least in certain areas, and that has a flow cross-section that increases in the direction of the at least one outlet opening. The voluted supply area extends in the circumferential direction of the rotational axis of the impeller or the further impeller in particular across an area that is as large as possible, and surrounds the structural component in the circumferential direction preferably almost completely. The pumping appliance can be an axial pump, a radial pump and/or a diagonal pump, and can provide a constant or a varying hydraulic fluid supply flow. The pumping appliance can for example be embodied with an Archimedes screw.

The gear device is preferably embodied as a planetary gear with an input shaft and an output shaft, and has a sun wheel, multiple planetary wheels and a hollow wheel, wherein the planetary wheels are connected to a planetary carrier in a rotatable manner.

The planetary gear is preferably part of a turbomachine that is embodied as a jet engine, wherein one structural component of the planetary gear, in particular a planetary carrier of the planetary gear device, is in operative connection with a fan of the turbomachine, and a further structural component of the planetary gear device, in particular a sun wheel of the planetary gear device, is in operative connection with a turbine appliance of the turbomachine, such as a low-pressure turbine or the like, wherein the hollow wheel is attached to the housing.

Preferably, one pumping appliance is assigned to at least one planetary wheel, in particular to all planetary wheels, or to the sun wheel.

In principle, the invention can be used with rotating as well as with non-rotating planetary gear devices.

Here, the structural component is preferably a sun wheel or a planetary wheel of the planetary gear device, whereas the further structural component is preferably a planetary carrier that preferably delimits the supply area at least in certain areas.

Here, a high hydraulic fluid pressure for supplying the planetary gear device can be provided in a simple manner through the rotational speed of the sun wheel or of the planetary wheel that is high as compared to the rotational speed of the planetary carrier during operation.

In a simple embodiment of the gear device according to the invention, the at least one hydraulic fluid supply device is embodied as a hydraulic fluid nozzle.

At least one seal device for sealing the further structural component against an environment can be provided, that is for example embodied as a contact seal or a labyrinth seal, and preferably opens a sealing gap between an internal space of the gear device and the environment during operation of the gear device due to the acting centrifugal force, so that a so-called temporarily open system is present. During operation, a self-adjusting oil supply can be realized through the opening of the sealing gap, while sealing against the environment is ensured thanks to the at least one seal during downtime.

It can also be provided that the area between the further structural component and the environment is embodied without a seal device, and the gear device is embodied with a so-called permanently open system for hydraulic fluid supply.

In the two last-mentioned embodiments, respectively one so-called self-adjusting hydraulic fluid supply is available for one structural component during operation.

In an advantageous embodiment of the invention, multiple outlet openings are provided, which are in particular provided for supplying bearing appliances or tooth meshings of the gear device, and together in particular form a so-called nozzle assembly or a so-called spraybar.

The features specified in the patent claims as well as the features specified in the following exemplary embodiments of the gear device according to the invention are suitable to further develop the subject matter according to the invention respectively on their own or in any desired combination with each other.

Further advantages and advantageous embodiments of the gear device according to the invention follow from the patent claims and from the exemplary embodiments that are described in principle in the following by referring to the drawing, wherein, with a view to clarity, the same reference signs are used in the description of the exemplary embodiments for structural components having the same structure and functionality.

Herein:

FIG. 1 shows a turbomachine that is embodied as a jet engine 1 or gas turbine engine that can be embodied with a gear device according to the invention. As will become clear in the following, the gear device according to the invention can also be used in other turbomachines or fluid-flow machines.

Figure 1:
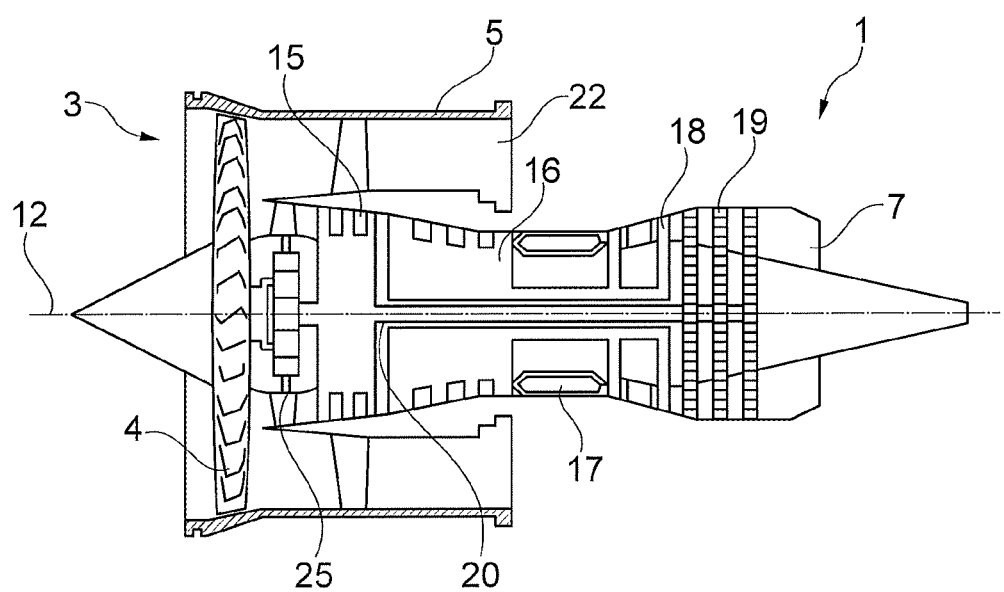
FIG. 1 shows a simplified sectional view of a jet engine with a fan and with a low-pressure turbine, wherein the fan is in operative connection with the low-pressure turbine via a planetary gear.

The jet engine 1 has a main axis and a rotational axis 12 auf. Further, the jet engine 1 comprises, in the axial flow direction, an air inlet 3, a fan 4, a gear device 25, an intermediate-pressure compressor 15, a high-pressure compressor 16, a combustion appliance 17, a high-pressure turbine 18, a low-pressure turbine 19 and an outflow nozzle 7. An engine nacelle 5 surrounds the gas turbine engine 1 and delimits the intake 3.

The jet engine 1 operates in a conventional manner, wherein air entering the intake 3 is accelerated by the fan 4 to create two air flows. A first air flow flows into the intermediate-pressure compressor 15, and a second air flow is passed through a bypass channel 22 to provide a drive thrust. The intermediate-pressure compressor 15 compresses the air flow supplied thereto before the air is further compressed in the area of the high-pressure compressor 16.

The compressed air that is discharged from the high-pressure compressor 16 is introduced into the combustion appliance 17, where an intermixing with fuel occurs, and the fuel-air mixture is combusted. The resulting hot combustion products expand and in doing so drive the high-pressure turbine 18 and the low-pressure turbine 19, before they are discharged via the discharge nozzle 7 to provide additional drive thrust. The high-pressure turbine 18 and the low-pressure turbine 19 respectively drive the high-pressure compressor 16 or the intermediate-pressure compressor 15 via a suitable connecting shaft. The connecting shaft 20 that couples the low-pressure turbine 19 to the intermediate-pressure compressor 15 also drives the fan 4 via the gear device 25.

Figure 2:
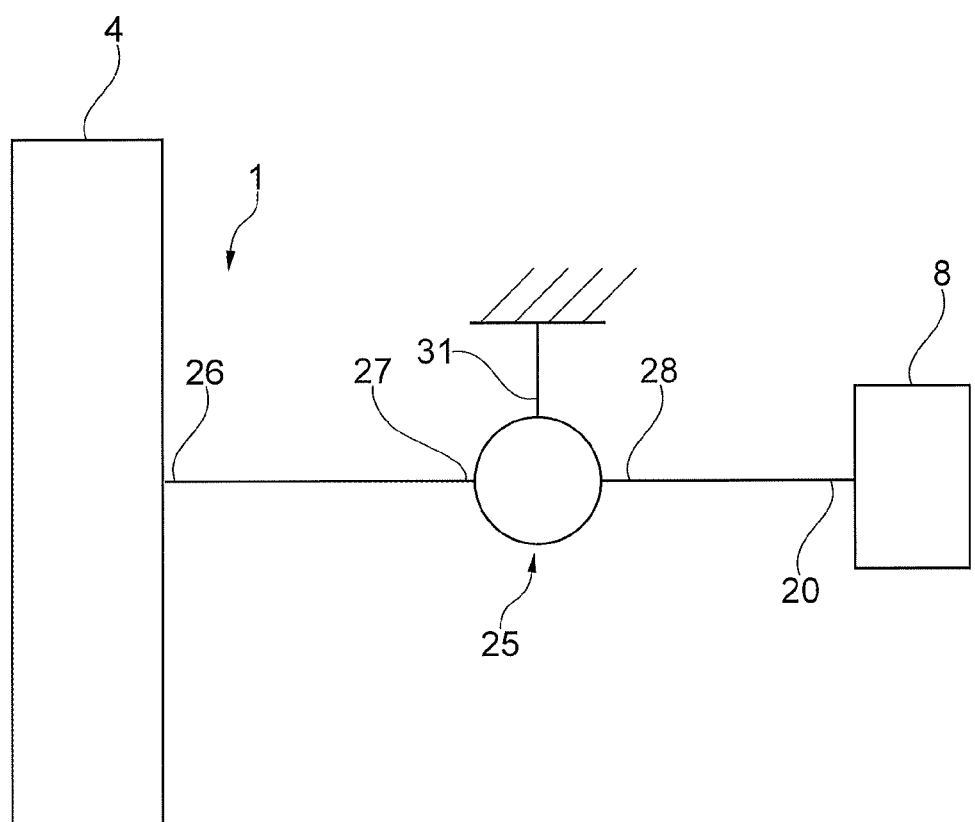
FIG. 2 shows a strongly schematized rendering of a partial area of the jet engine according to FIG. 1 which comprises the planetary gear, wherein the fan is in operative connection with the planetary carrier of the planetary gear and the low-pressure turbine is coupled to a sun wheel of the planetary gear.

FIG. 2 shows a section of the jet engine 1 according to FIG. 1 in a strongly schematized manner, wherein the gear device 25 shown in FIG. 1 is embodied as a planetary gear or planetary gear device. Here, the connecting shaft or shaft 20 is connected to a sun wheel 28 of the planetary gear device 25, whereas, in the area of a fan shaft 26, the fan 4 is in operative connection with a structural component of the planetary gear device 25 that represents a rotating planetary carrier 27. In the shown embodiment of the planetary gear device 25, a hollow wheel 31 of the planetary gear device 25 is arranged so as to be fixated at the housing. In alternative embodiments of the gear device, the planetary carrier or the sun wheel can also be embodied in a manner fixated to the housing.

With the shown coupling of the fan shaft 26 and the low-pressure shaft 20 of the low-pressure turbine 19 to the planetary gear device 25, a drive torque applied to the planetary gear device 25 via the low-pressure shaft 20 is increased corresponding to the stationary gear ratio of the planetary gear device 25, and is supplied to the fan shaft 26, while the speed of the shaft 20 is larger than the speed of the fan shaft 26 by the factor of the stationary gear ratio of the planetary gear device 25. If the fan 4 is driven by the low-pressure turbine 19, the speed of the shaft 20 is reduced corresponding to the gear ratio of the planetary gear device 25 in the area of the planetary gear device 25, and the fan shaft 26 as well as the fan 4 are driven with this reduced speed and with a torque that is increased with respect to the torque applied to the shaft 20.

Figure 3:
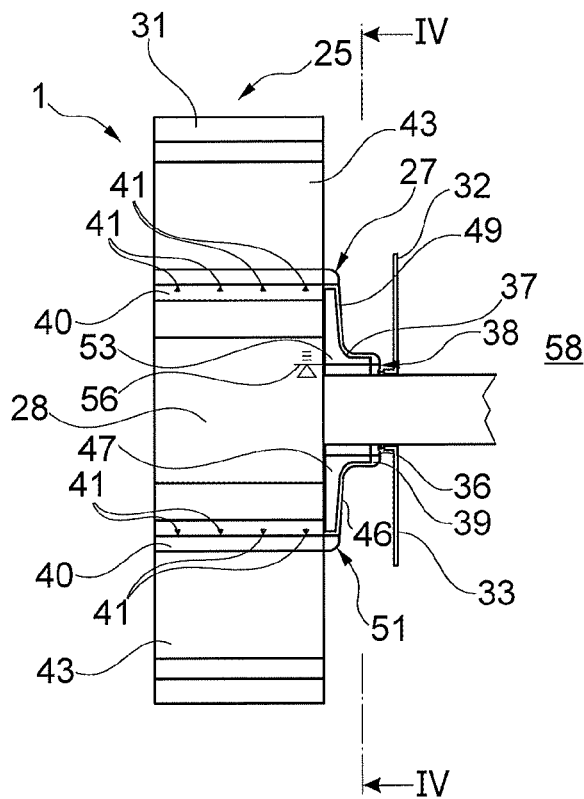
FIG. 3 shows a simplified sectional view of the planetary gear according to FIG. 1 and FIG. 2, wherein a pumping appliance is shown by means of which a pressure can be applied to a hydraulic fluid that is supplied to the planetary gear via a hydraulic fluid nozzle.
Figure 4:
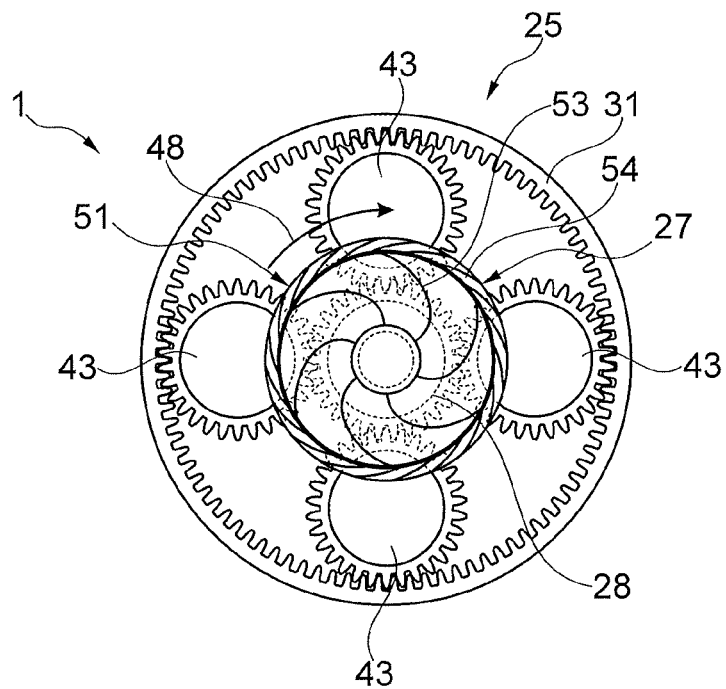
FIG. 4 shows a simplified sectional view through the planetary gear according to FIG. 3 along the line IV-IV.

For supplying the planetary gear device 25 with hydraulic fluid or oil, oil is supplied to the planetary gear device 25 shown in more detail in FIG. 3 and FIG. 4, for example via a hydraulic pump that is arranged in the area of an ancillary unit gear device, and in the present case are supplied or sprayed into an internal space 37 of the planetary gear device 25 through a gap 36 that is present in the radial direction of the sun wheel 28 between the sun wheel 28 and the planetary carrier 27 and that forms a supply opening 38 via multiple hydraulic fluid supply devices that are arranged at the circumferential side of the sun wheel 28 and are embodied as oil nozzles 32, 33.

Via a supply area 39 that is arranged in the internal space 37 of the planetary gear device 25, the oil that is supplied through the supply opening 38 is supplied to a further supply area 40 that is arranged in the circumferential direction of the planetary gear device 25 between the planetary wheels 43 of the planetary gear device 25 in the area of tooth meshings of the planetary wheels 43 with the sun wheel 28, and that extends substantially in the axial direction of the planetary gear device 25, and is arranged downstream of the supply area 39.

In the further supply area 40, which is embodied as a so-called spraybar or as a nozzle assembly, a plurality of outlet openings 41 are arranged, via which in the present case tooth meshings between the planetary wheels 43 of the planetary gear device 25 and of the sun wheel 28 can be supplied with oil. In the present case, four planetary wheels 43 are provided, wherein a further supply area 40 is assigned to every planetary wheel 43, so that oil can be supplied to the desired extent to the respective tooth meshings of the planetary wheels 43 with the sun wheel 28.

To provide an oil pressure in the area of the outlet openings 41 as it is necessary for supplying the tooth meshings, a pumping appliance with an impeller 47 that is embodied as a centrifugal pumping appliance 46 and in the present case acts diagonally is arranged downstream of the supply opening 38 in the supply area 39. Here, the impeller 47 is firmly connected to the sun wheel 28 in the axial as well as in the radial direction of the gear device 25, so that the impeller 47 rotates with the sun wheel 28. The impeller 28 has a high rotational speed difference as compared to the planetary carrier 27 that in the present case rotates in the same rotational direction 48 as the sun wheel 28, and runs faster than the planetary carrier 27 of the planetary gear device 25 that rotates with the lowest rotational speed of the planetary gear device 25 during operation. To achieve a maximally possible efficiency of the centrifugal pumping appliance 46, a gap 49 that is present in the axial and in the radial direction of the planetary gear device 25 between the impeller 28 and the planetary carrier 27 is chosen to be as small as possible.

In a radially outer area, the impeller 47 has a radius that in the present case substantially corresponds to a radius in the range of which the further supply area 40 extends in the axial direction of the planetary gear device 25. Alternatively, it can also be provided that the impeller 47 has a radius that is comparatively larger, so that, at least in certain areas, oil is supplied during operation of the jet engine 1 via a recirculation line from a radially outer edge area of the impeller 47 to the further supply area 40 arranged on a smaller radius range.

A pressure recovery appliance, which in the present case is embodied as a further impeller 51, is arranged outside of the impeller 47 in the radial direction of the sun wheel 28, and is connected in a torque-proof manner to the planetary carrier 27. To achieve a maximally possible pressure increase and thus a maximally advantageous transformation of a dynamic pressure into a static pressure, the blades 53 of the impeller 47 are bent in the circumferential direction in the opposite direction as the blades 54 of the further impeller 51. Alternatively or additionally, the blades 53, 54 can also be embodied so as to be bent in the axial direction and/or the circumferential direction of the planetary gear device 25.

What is in particular provided is an open oil system, i.e. the internal space 37 has an access to an environment 58 in all operational states and is not sealed against the same. A thus realized planetary gear device 25 with a self-pumping gear lubricant supply is characterized by an advantageously low wear and is particularly fail-safe. Through the open oil system, an oil level 56 shown by way of example in FIG. 3 occurs in the internal space 37 of the planetary gear device 25 during operation of the jet engine 1 depending on an amount of oil supplied via the oil nozzles 32 and a back pressure present in the area of the outlet openings 41. Through an increase in the amount of supplied oil, a pressure present in the internal space 37 is increased and causes the rise of the oil level 56 in the direction of the sun wheel 28, whereas in the event of a reduction in the amount of supplied oil the pressure is decreased and the oil level 56 is lowered. Thus, the oil level 56 present in the internal space 37 or in the supply area 39 and the further supply area 40 adjusts itself.

Alternatively, it can also be provided that the planetary carrier 27 is sealed against the environment 58 by means of at least one seal device, which may for example be embodied as a contact seal or a labyrinth seal. Here, at least one seal device can be embodied as a lifting seal in such a manner, that an opening for connecting the internal space 37 with the environment 58 is opened in the area of the seal device during operation of the jet engine 1, and in this manner wear to the at least one seal device is strongly reduced during operation of the jet engine 1. In addition, in non-rotating or slowly rotating structural components of the planetary gear device 25, all areas of the planetary gear device 25 can be supplied with oil through the internal space 37 of the planetary gear device 25 also without the effect of the centrifugal force through the seal devices that separate the environment from the internal space 37 in this operational state.

FIG. 5 to FIG. 13 show further embodiments of planetary gear devices 60, 70, 80, 90, 100 that can be used for connecting the shaft 20 of the low-pressure turbine 19 to the fan shaft 26. Regarding the functionality of the planetary gear devices 60, 70, 80, 90, 100 that will be described in more detail in the following, it is generally referred to the description regarding the planetary gear device 25, and in the following substantially only the differences between the planetary gear device 25 and the planetary gear devices 60, 70, 80, 90, 100 are discussed.

Figure 5:
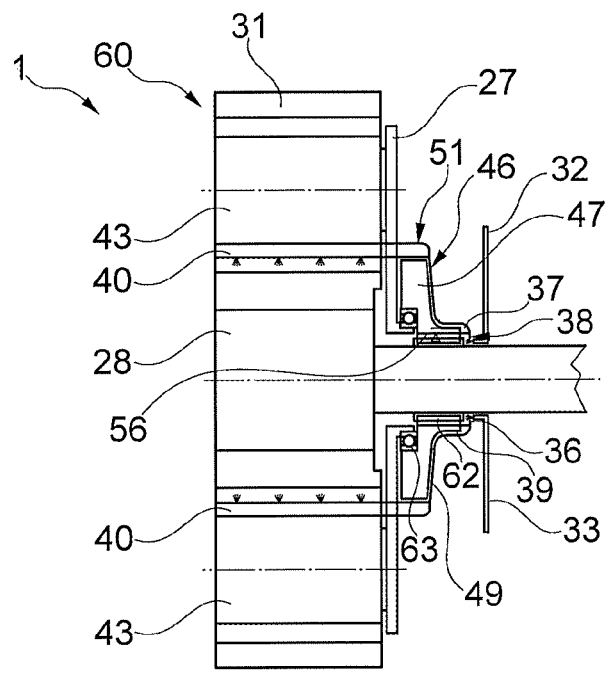
FIG. 5 shows a view of a second embodiment of a planetary gear corresponding to FIG. 3.

In the planetary gear device 60 shown in FIG. 5, the impeller 47 of the pumping appliance 46 is connected to the sun wheel 28 in a torque-proof manner via a splined connection 62, wherein the impeller 47 is additionally mounted with respect to the planetary carrier 27 by means of a bearing appliance that in the present case is realized as a ball bearing 63. In this manner, a tilting or a radial movement of the impeller 47 with respect to the sun wheel 28 is facilitated during operation of the jet engine 1. As a result, the gap 36 between the planetary carrier 27 and the impeller 47 is advantageously small even if movements of the sun wheel 28 with respect to the planetary carrier 27 occur during operation of the jet engine 1, whereby an efficiency of the pumping appliance 46 is in turn advantageously high.

Figure 6:
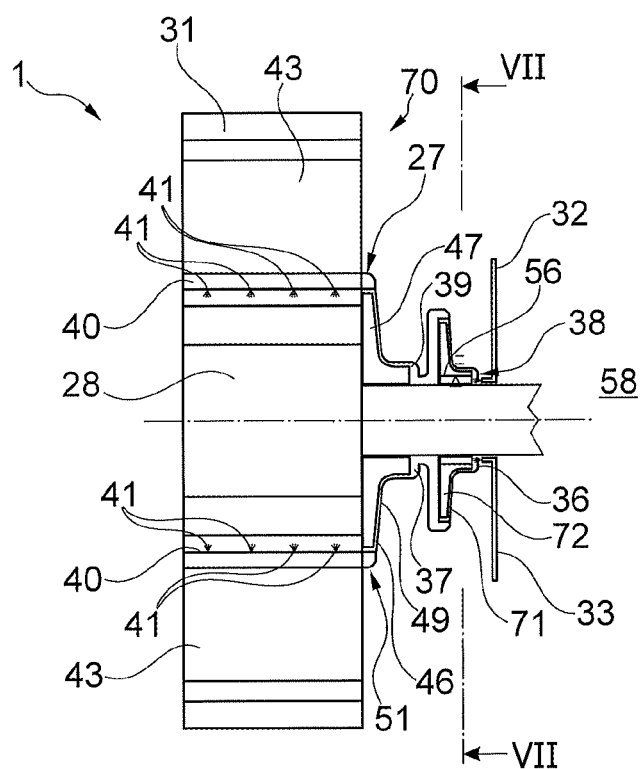
FIG. 6 shows a view of a third embodiment of a planetary gear corresponding to FIG. 3, with two pumping appliances that are respectively embodied with an impeller.
Figure 7:
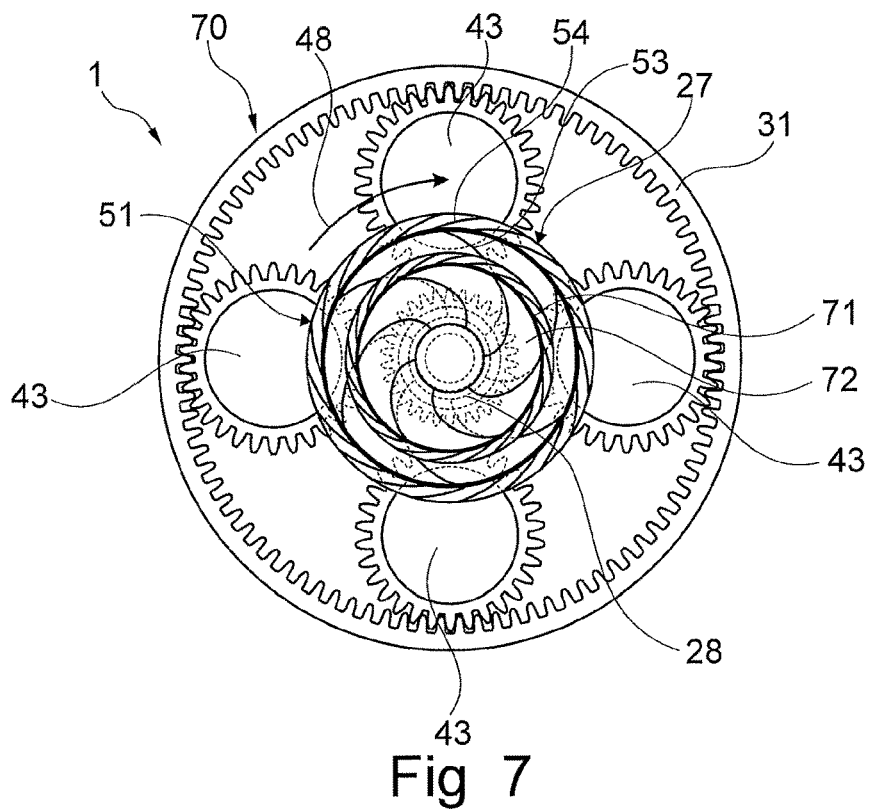
FIG. 7 shows a simplified sectional view through the planetary gear according to FIG. 6 along the line VII-VII.

In the embodiment of the planetary gear device 70 according to FIG. 6 and FIG. 7, a further pumping appliance 71 is provided in addition to the pumping appliance 46, with the further pumping appliance 71 being embodied with an impeller 72 in a manner comparative to the pumping appliance 46 and being arranged upstream of the pumping appliance 46 with respect to the supply opening 38. In the further pumping appliance 46, a pressure increase is achieved through the recirculation of the oil downstream of the impeller 72 to a smaller radius, so that the oil supplied to the pumping appliance 46 has a pressure that is increased with respect to the embodiment of the planetary gear device 25. Thus, a particularly high oil pressure is available for supplying the tooth meshings of the planetary wheels 43 with the sun wheel 28.

Figure 8:
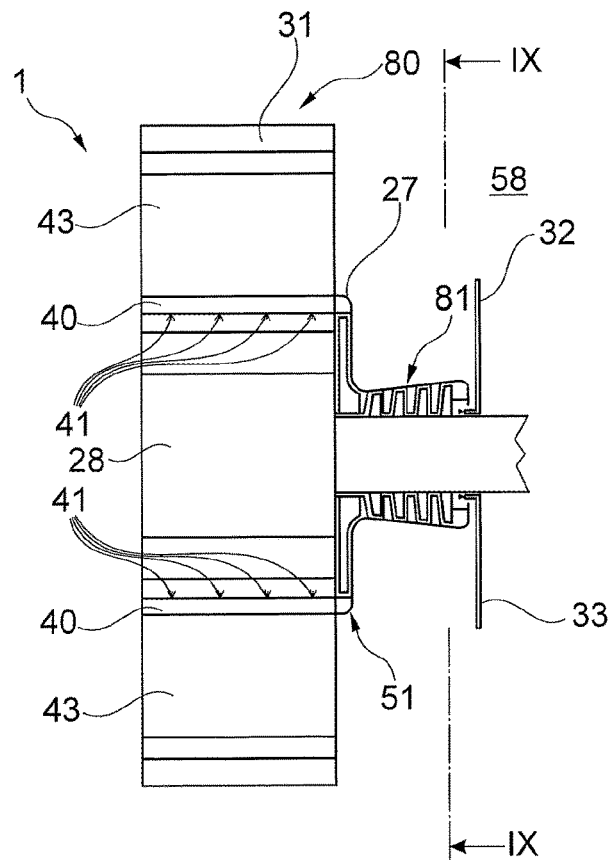
FIG. 8 shows a view of a fourth embodiment of a planetary gear corresponding to FIG. 3, with two pumping appliances, wherein one pumping appliance is embodied as an axial pump and the other pumping appliance is embodied with an impeller.
Figure 9:
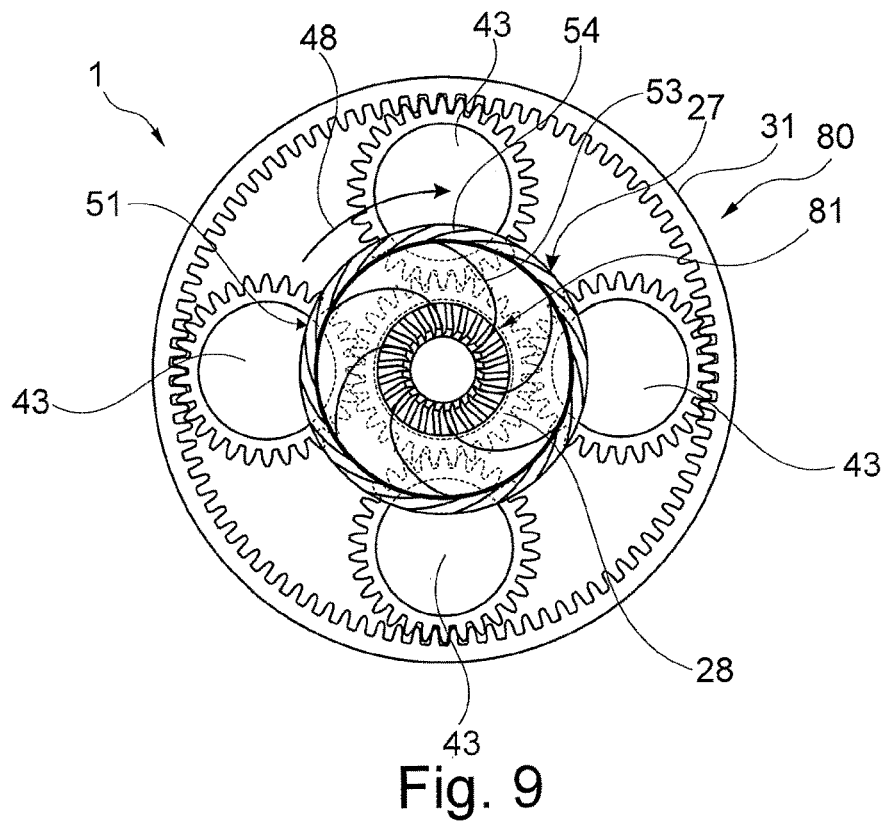
FIG. 9 shows a simplified sectional view through the planetary gear according to FIG. 8 along the line IX-IX.

FIG. 8 and FIG. 9 show a planetary gear device 80 in which a pumping appliance embodied as an axial pump 81 is arranged downstream of the supply opening, which is in turn arranged upstream of the pumping appliance 46. Comparable to the planetary gear device 70, an oil pressure applied to the pumping appliance 46 is also high with the planetary gear device 80, so that an oil pressure available for supplying the planetary gear device 80 is advantageously high in the area of the outlet openings 41. The impeller 47 of the pumping appliance 46 is again connected to the sun wheel 28 in a torque-proof manner. However, in an alternative embodiment of the invention, it can be connected in a torque-proof manner to the planetary carrier 27.

Figure 10:
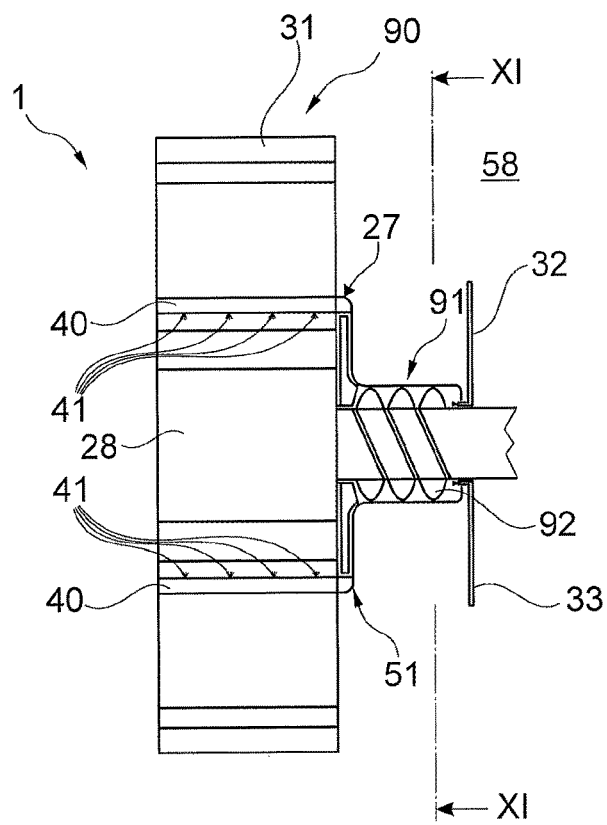
FIG. 10 shows a view of a fifth embodiment of a planetary gear corresponding to FIG. 3, with two pumping appliances, wherein one pumping appliance is embodied with an Archimedes screw and the other pumping appliance is embodied with an impeller.
Figure 11:
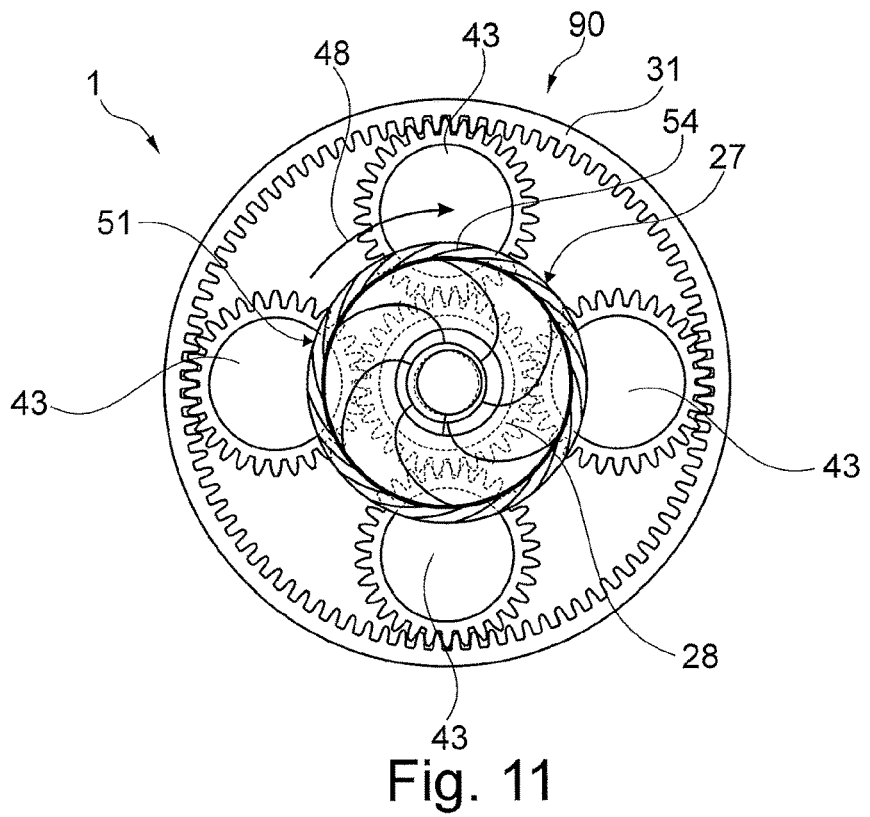
FIG. 11 shows a simplified sectional view through the planetary gear according to FIG. 10 along the line XI-XI.

A further planetary gear device 90 substantially corresponding to the planetary gear device 80 is shown in FIG. 10 and FIG. 11, wherein in the present case a pumping appliance 91, which is embodied with an Archimedean spiral 92 and by means of which a pressure of the oil supplied in the area of the supply opening 38 can be increased, is arranged upstream of the pumping appliance 46.

Figure 12:
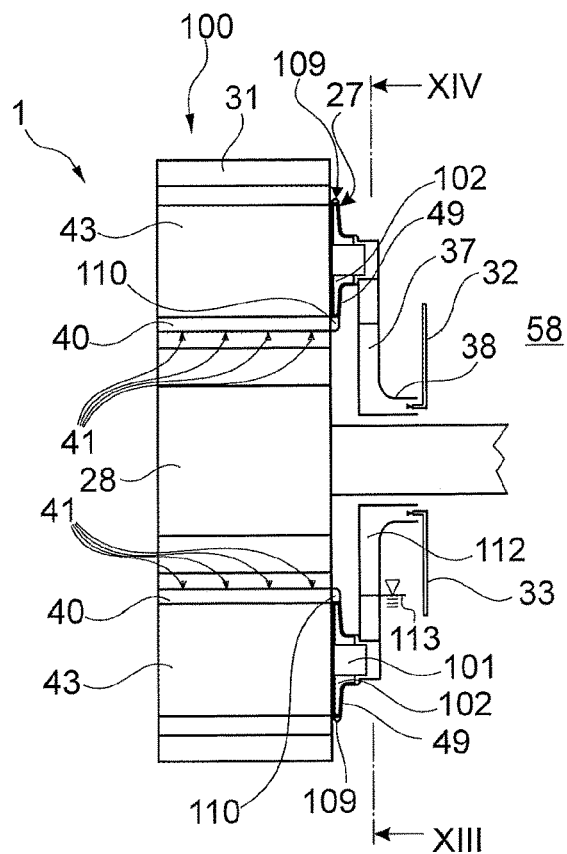
FIG. 12 shows a view of a sixth embodiment of a planetary gear corresponding to FIG. 3, in which a pumping appliance is assigned to each planetary wheel.
Figure 13:
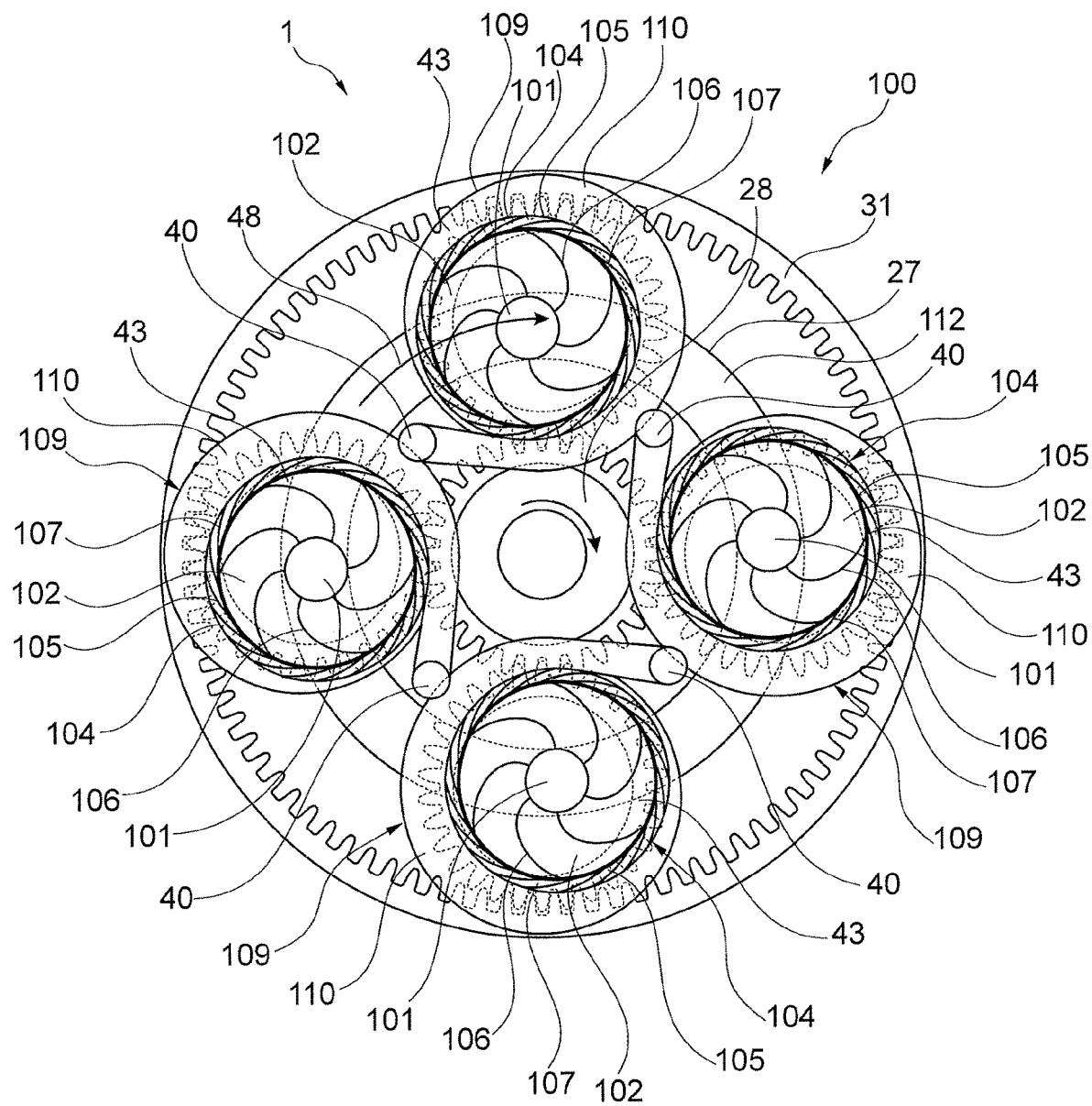
FIG. 13 shows a simplified sectional view through the planetary gear according to FIG. 12 along the line XIII-XIII.

FIG. 12 and FIG. 13 show a planetary gear device 100 in which the respective planetary wheels 43 respectively represent the structural component and the planetary carrier 27 represents the further structural component. Planetary shafts 101 are in operative connection with the planetary wheels 43, wherein the planetary wheels 43 are respectively mounted so as to be rotatable with respect to the planetary carrier 27 in particular by means of bearing appliances that are not shown in more detail. For this purpose, the bearing appliances are arranged either inside or outside of the planetary wheels 43 in the axial direction of the planetary wheels 43 so as to be able to realize a rotation decoupling between the planetary shafts 101 and the planetary carrier 27 or between the planetary shafts 101 and the planetary wheels 43.

In the present case, respectively one pumping appliance 103 that is embodied with an impeller 102 is connected in a torque-proof manner to all planetary wheels 43, wherein it can also be provided that a pumping appliance 103 is assigned to only one planetary wheel 43 or to selected planetary wheels 43. Respectively one pressure recovery appliance 104 with a further impeller 105 is arranged radially outside of the impeller 102 with respect to the respective planetary shafts 101, wherein the blades 106, 107 of the impellers 102, 105 are embodied in a comparable manner to the impellers 47, 51, in particular so as to be bent in opposite directions with respect to each other in the circumferential direction of the planetary shaft 101.

Again radially outside of the further impeller 105 with respect to the respective planetary shaft 101, respectively one further pressure recovery appliance 109 with a supply area 110 is provided, which preferably has a flow cross-section that continuously increases in the direction of the associated further supply area 40 to transform dynamic pressure into static pressure. Here, the supply area 110 is preferably embodied in a voluted manner. A comparable supply area 110 can also be provided in the embodiments of the planetary gear devices 25, 60, 70, 80 and 90.

In contrast to the planetary gear devices 25, 60, 70, 80, 90, in the planetary gear device 100 oil is introduced from the oil nozzles respectively into a supply area 112 that is connected in a torque-proof manner to the planetary carrier 27, wherein oil is supplied via the supply area 112 from the supply openings 38, which are again arranged radially inside the outlet openings 41 in the radial direction of the planetary gear device 100, in the direction of the respective impellers 102, in the area of which an oil pressure is again increased to the previously described extent.

Here, an oil level 113 that is indicated in FIG. 12 occurs in the supply area 112 during operation of the planetary gear device 100 in a comparable manner to the embodiments regarding planetary gear device 25.

| | Parts list |
|---|---|
| 1 | turbomachine; jet engine |
| 3 | air inlet |
| 4 | fan |
| 5 | engine nacelle |
| 7 | outflow nozzle |
| 12 | engine axis |
| 15 | intermediate-presure compressor |
| 16 | high-pressure compressor |
| 17 | combustion appliance |
| 18 | high-pressure turbine |
| 19 | low-pressure turbine |
| 20 | connecting shaft |
| 22 | bypass channel |
| 25 | gear device; planetary gear device |
| 26 | fan shaft |
| 27 | further structural component of the planetary gear device; planetary carrier |
| 28 | structural component of the planetary gear device; sun wheel |
| 31 | hollow wheel of the planetary gear device |
| 32, 33 | hydraulic fluid supply device; oil nozzle |
| 36 | gap |
| 37 | internal space of the planetary gear device |
| 38 | supply opening |
| 39 | supply area |
| 40 | further supply area |
| 41 | outlet opening |
| 43 | planetary wheel |
| 46 | pumping appliance; centrifugal pumping appliance |
| 47 | impeller |
| 48 | rotational direction |
| 49 | gap |
| 51 | pressure recovery appliance; further impeller |
| 53 | blades of the impeller |
| 54 | blades of the further impeller |
| 56 | oil level |
| 58 | environment |
| 60 | gear device; planetary gear device |
| 62 | splined connection |
| 63 | bearing appliance; ball bearing |
| 70 | gear device; planetary gear device |
| 71 | further pumping appliance |
| 72 | impeller |
| 80 | gear device; planetary gear device |
| 81 | pumping appliance; axial pump |
| 90 | gear device; planetary gear device |
| 91 | pumping appliance |
| 92 | Archimedean spiral |
| 100 | gear device; planetary gear device |
| 101 | planetary shaft |
| 102 | impeller |
| 103 | pumping appliance |
| 104 | pressure recovery appliance |
| 105 | further impeller |
| 106 | blade of the impeller |
| 107 | blade of the further impeller |

-continued

Parts list

| | |
|---|---|
| 109 | further pressure recovery appliance |
| 110 | supply area |
| 112 | supply area |
| 113 | oil level |

The invention claimed is:

1. A gear device, comprising:
a rotatable structural component,
a further structural component that delimits a supply area,
a consumption point that is to be supplied with hydraulic fluid via the supply area,
wherein hydraulic fluid from a hydraulic fluid supply device is introduced into the supply area via a supply opening, and is discharged via an outlet opening from the supply area for supplying the consumption point,
at least one pumping appliance driven by the structural component and positioned inside the supply area for transporting the hydraulic fluid from the supply opening in a direction of the outlet opening;
a spline connection connecting the at least one pumping appliance to the structural component, and a bearing appliance mounting the at least one pumping appliance with respect to a further rotatable structural component of the gear device.

2. The gear device according to claim 1, wherein the at least one pumping appliance is a flow pump or a positive displacement pump.

3. The gear device according to claim 1, wherein the at least one pumping appliance includes multiple pumping appliances arranged in the supply area behind each other in a flow direction of the hydraulic fluid.

4. The gear device according to claim 1, wherein the at least one pumping appliance is connected to the structural component in a torque-proof manner.

5. The gear device according to claim 1, wherein the at least one pumping appliance includes an impeller that is connected in a torque-proof manner to the structural component.

6. The gear device according to claim 1, and further comprising a pressure recovery appliance arranged downstream of the at least one pumping appliance.

7. The gear device according to claim 6, wherein the pressure recovery appliance includes a further impeller that is connected to the further structural component in a torque-proof manner and contains the impeller.

8. The gear device according to claim 5, wherein at least one chosen from the impeller and the further impeller includes blades that are straight or bent in at least one chosen from an axial direction, a radial direction and a circumferential direction.

9. The gear device according to claim 7, wherein the pressure recovery appliance is guided through a supply area that is arranged radially outside of the impeller or of the further impeller, and that extends in a circumferential direction of the structural component or of the further structural component at least in certain areas, and that has a flow cross-section that increases in a direction of the outlet opening.

10. The gear device according to claim 1, wherein the structural component is a sun wheel or a planetary wheel.

11. The gear device according to claim 1, wherein the further structural component is a planetary carrier.

12. The gear device according to claim 1, wherein the hydraulic fluid supply device is a hydraulic fluid nozzle.

13. The gear device according to claim 1, and further comprising a seal device for sealing the further structural component against an environment.

14. The gear device according to claim 13, wherein the seal device opens a gap between an internal space of the further structural component and the environment during operation due to an acting centrifugal force.

15. A gear device, comprising:
a rotatable structural component,
a further structural component that delimits a supply area,
a consumption point that is to be supplied with hydraulic fluid via the supply area,
wherein hydraulic fluid from a hydraulic fluid supply device is introduced into the supply area via a supply opening, and is discharged via an outlet opening from the supply area for supplying the consumption point,
at least one pumping appliance driven by the structural component and positioned inside the supply area for transporting the hydraulic fluid from the supply opening in a direction of the outlet opening;
wherein the at least one pumping appliance includes multiple pumping appliances arranged in the supply area behind each other in a flow direction of the hydraulic fluid.

16. A gear device, comprising:
a rotatable structural component,
a further structural component that delimits a supply area,
a consumption point that is to be supplied with hydraulic fluid via the supply area,
wherein hydraulic fluid from a hydraulic fluid supply device is introduced into the supply area via a supply opening, and is discharged via an outlet opening from the supply area for supplying the consumption point,
at least one pumping appliance driven by the structural component and positioned inside the supply area for transporting the hydraulic fluid from the supply opening in a direction of the outlet opening;
a pressure recovery appliance arranged downstream of the at least one pumping appliance;
wherein the pressure recovery appliance includes a further impeller that is connected to the further structural component in a torque-proof manner and contains the impeller.

17. The gear device according to claim 16, wherein the pressure recovery appliance is guided through a supply area that is arranged radially outside of the impeller or of the further impeller, and that extends in a circumferential direction of the structural component or of the further structural component at least in certain areas, and that has a flow cross-section that increases in a direction of the outlet opening.

* * * * *